G. O. SMALLEY.
SELF LUBRICATING BEARING.
APPLICATION FILED JULY 25, 1913.

1,153,647.

Patented Sept. 14, 1915.

WITNESSES:

INVENTOR
George O. Smalley,
BY
ATTORNEY

UNITED STATES PATENT OFFICE.

GEORGE O. SMALLEY, OF BOUNDBROOK, NEW JERSEY, ASSIGNOR TO THE GRAPHITE LUBRICATING COMPANY, OF BOUNDBROOK, NEW JERSEY, A CORPORATION OF NEW JERSEY.

SELF-LUBRICATING BEARING.

1,153,647.   Specification of Letters Patent.   Patented Sept. 14, 1915.

Application filed July 25, 1913. Serial No. 781,129.

*To all whom it may concern:*

Be it known that I, GEORGE O. SMALLEY, a citizen of the United States, and a resident of Boundbrook, in the county of Somerset and State of New Jersey, have invented certain new and useful Improvements in Self-Lubricating Bearings, of which the following is a full, clear, and exact description, whereby any one skilled in the art may make and use the same.

The invention relates to self lubricating bearings, that is, a bearing which does not require the application of a lubricant but is so formed that a lubricating material forms a part of the bearing structure and thus, from the inherent characteristics of the materials from which the bearing is made, it is constantly self lubricating.

The invention relates more particularly to the arrangement of the lubricant within the metal portion of the bearing box and as hereinafter defined is so disposed that a maximum of lubrication is provided for all parts of the structure without unduly weakening the metallic casing which holds it.

The object of the invention is to provide a bearing of the character defined in which a comparatively small rotary or oscillatory movement will carry the contained lubricant completely over the metallic surface.

A further object is to provide a series of grooves or holding recesses for the lubricant within the metal casing so disposed that studs of metal completely surrounded by a lubricant will be provided to sustain the weight of the shaft or like part used in the bearing.

Figure 1:
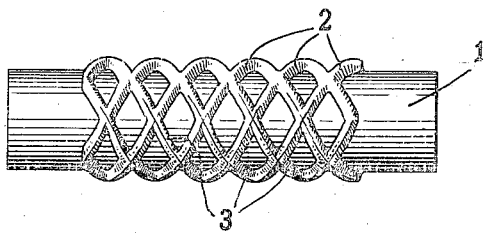
Figure 2:
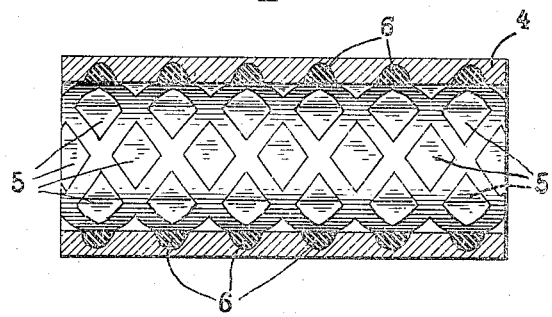
Figure 3:
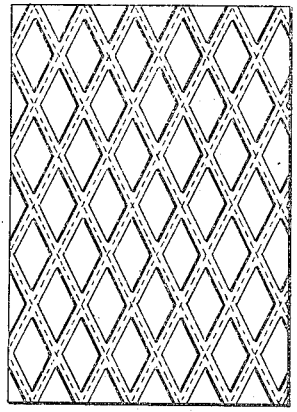

Referring to the drawings, Figure 1 illustrates a core from which the bearing box is cast. Fig. 2 illustrates a central section through a bearing box. Fig. 3 illustrates a development of the interior grooves of the box.

It has not been an uncommon practice to produce self lubricating bearings composed of metal with graphite inserted therein to serve as a lubricating media and the invention herein defined relates particularly to a bearing formed preferably of bronze and provided interiorly with grooves within which is contained a compound of graphite which will serve to lubricate the shaft and all metallic parts of the bearing box. Obviously, in such devices, it is imperative to sustain weight of the shaft as far as possible upon the solid metal of the bearing box and the device herein described is intended to provide studs of metal which will sustain the weight and will be so arranged with reference to each other that they are distributed in a definite manner throughout the interior of the bearing box through each stud or series of studs is isolated from the adjacent stud or series of studs by the lubricating material which completely surrounds the studs.

In Fig. 1, a core is illustrated to more clearly indicate the position and arrangement of the grooves formed in the metal of the bearing box and the intermediate studs of metal which are completely surrounded by the grooves which grooves when filled with graphite provide a lubricant completely surrounding each of the studs.

The core, as illustrated, has a central cylindrical portion 1 upon which are formed a series of spiral threads 2 extending spirally and in parallelism in one direction around the core 1 and with a second series of threads 3 extending in the opposite direction around the core and of course, intersecting the threads 2. These, when the metal is cast about the core, will form corresponding grooves in the metal casing 4 as illustrated in Fig. 2, and between the threads there will remain metallic bosses or studs 5 each of which is completely surrounded by the graphite compound or lubricant 6.

It is apparent that the studs 5 will follow what is generally a spiral line and due to the formation of the threads intersecting each other, these studs will be substantially of diamond shape extending in series of parallel spirals about the bearing. The arrangement is such that the alinement of these studs longitudinally of the bearing provides a series of studs alternating with the inserted graphite and with the next line of studs projecting slightly within the line of each succeeding row or line of studs.

With this arrangement of parts, it is apparent that a very slight rotary or oscillatory movement of the bearing or its shaft will cause a sufficient movement to traverse the inserted graphite portions and carry a film of graphite over the bearing studs 5. This is particularly advantageous in bearings used for springs and in fact, wherever there is a comparatively short oscillatory movement rather than a full rotary movement of the shaft. Furthermore, the metallic bearing surfaces are evenly dispersed and each bearing stud is completely surrounded by the lubricating material.

In forming the bearing, the cores illustrated in Fig. 1 are first produced in any ordinary type of core box, having grooves corresponding to the raised threads 2 and 3 of the core 1. The metal is then cast providing a bearing box having grooves corresponding to the raised threads of the core. The tubular bearing box (if it is a single piece bearing) is then packed with graphite compound which, under high pressure is forced into the grooves, the excess material being removed, leaving the grooves filled to the same height as the bearing studs. The bearing is then vulcanized and the interior and exterior finished to size.

Obviously, the threading may be of the single, double, treble or quadruple type and may be of any desired pitch to meet the exigencies of any particular requirement. Irrespective of the pitch and character of thread, it is essential to the present invention that the threading run in opposite directions, that is, that there be a series of threads, say of right hand form and an intersecting series of left-hand form. These intersecting threads providing intermediate metallic portions which are completely surrounded by the graphite filling.

Obviously, the bearing may be of the split-bearing form or the tubular type and the threading may be of a size and form to best correspond to the size and form of the bearing.

What I claim as my invention and desire to secure by Letters Patent is:

1. A bearing having a shell provided with continuous lubricating grooves formed in parallel spiral threads of coarse pitch from end to end of the bearing and with similarly formed continuous spiral threads of coarse pitch extending in an opposite direction from end to end of the bearing, all of said threads located entirely within the metal of the shell and intersecting each other, and a lubricating material pressed into and filling said grooves.

2. A bearing having a shell provided with two series of continuous right-hand spiral grooves of thread form of coarse pitch and a series of left-hand spiral grooves of thread form of coarse pitch, one of said series of grooves intersecting the other and providing intermediate metallic bearing studs, all of said grooves terminating within the metal of the shell and each of said studs being completely surrounded by the intersecting grooves and a compressed lubricating material filling said grooves.

3. A bearing provided with a right-hand spiral groove of thread form of coarse pitch and a left-hand spiral groove of thread form and of coarse pitch, the pitch of said grooves being the same, and said grooves all terminating within the material of the shell, said grooves intersecting each other and providing intermediate the intersections bearing studs, said studs completely surrounded by the intersecting grooves and a compressed lubricating material filling said grooves.

4. A bearing having a shell provided with a series of bearing studs each completely surrounded by a compressed lubricating material and extending in a series of spiral lines of thread form completely about the interior of the shell, the lines of compressed lubricating material surrounding said studs terminating within the bearing shell.

GEORGE O. SMALLEY.

Witnesses:
H. WARREN BORCHERS,
F. M. EVANS.